(12) United States Patent
Khan Riaz et al.

(10) Patent No.: US 6,482,941 B1
(45) Date of Patent: Nov. 19, 2002

(54) CARBOXYLATED POLYSACCHARIDES 6-SUBSTITUTED

(75) Inventors: Ahmed Khan Riaz, Sonning (GB); Regina Vesnaver, Trieste (IT); Luca Stucchi, Pavia Di Udine (IT); Marco Bosco, Gradisca D'Isonzo (IT)

(73) Assignee: Societa' Cooperative Centro Ricerche Poly-Tech a Responsabilita' Limitata, Trieste (IT)

( * ) Notice: Subject to any disclaimer, the term of this patent is extended or adjusted under 35 U.S.C. 154(b) by 0 days.

(21) Appl. No.: 09/509,653

(22) PCT Filed: Oct. 6, 1998

(86) PCT No.: PCT/EP98/06346
§ 371 (c)(1),
(2), (4) Date: Mar. 29, 2000

(87) PCT Pub. No.: WO99/18133
PCT Pub. Date: Apr. 15, 1999

(30) Foreign Application Priority Data

Oct. 8, 1997 (IT) .......................................... MI97A2285

(51) Int. Cl.$^7$ ................................................ C07H 1/00
(52) U.S. Cl. ..................... 536/123.1; 536/124; 536/127
(58) Field of Search ............................ 514/23, 25, 54; 536/1.11, 4.1, 18.4, 18.5, 55.3, 123.1, 124, 127

(56) References Cited

PUBLICATIONS

Aspinall et al. Can. J. Chem. 1984, 62, 2728–2735.*
Aspinall et al. Can. J. Chem. 1984, 62, 2736–2739.*
Chemical Abstracts, vol. 104, No. 16, Apr. 21, 1986, Columbus, Ohio, US; abstract No. 131851, "Pectin asulfonate manufacture" XP002091965 & JP 60 202101 A (shizuoka prefecture) Oct. 12, 1985.

"An Improved Procedure for the Preparation of Chlorinated Cellulose with Methanesulfonyl Chloride in a Dimethylforma–Mide–Chloral–Pyridine Mixture", Journal of Polymer Science, Polymer Chemistry Edition, vol. 28, No. 8, Jul. 1, 1990, pp. 2223–2227.

Mocanu G et al: "Chemical Reactions on Polysaccharides, 5A", Angewandte Makromolekulare Chemie, Applied Macromolecular Chemist ry and Physics, vol. 241, Sep. 1996, pp. 1–10.

M. E. Evans et al.: "Reaction of Carbohydrates with Methylsulfonyl Chloride In N,N–Dimethylformamide. Preparation of some methyl–6–chloro–6–deoxyglycosides" The Journal of Organic Chemistry, vol. 33, No. 3, 1968, pp. 1074–1076.

* cited by examiner

*Primary Examiner*—James O. Wilson
*Assistant Examiner*—Patrick Lewis
(74) *Attorney, Agent, or Firm*—Hedman & Costigan, P.C.

(57) ABSTRACT

A new class of polysaccharides containing carboxylic groups selectively substituted with halogens on the carbon atom on position 6 of the glicopyranosidic residue and the procedure to obtain these derivatives is therein described. The procedure entails the halogenation of carboxylated polysaccharides with alkyl aryl sulfonyl-halides in organic solvent. The products of this invention can be used as substrates in synthesis where the reactive site is the carbon that binds the halogen. Moreover, they can be used in the medical-diagnostic field.

16 Claims, No Drawings

CARBOXYLATED POLYSACCHARIDES 6-SUBSTITUTED

STATE OF THE ART

Polysaccharides containing carboxylic groups are widely used in several branches like pharmaceutics, medicine, cosmetics, and food. Hyaluronic acid, gellan, xanthan exemplify these products. The fact that many of these products can be recovered from natural sources and that they are biocompatible and biodegradable have promoted their use as a replacement of the conventional synthetic polymers like polyacrylic and polyolefinic products. Among the carboxylated polysaccharides, hyaluronic acid is particularly worthy of note. This polysaccharide is ubiquitous in any animal species and in the unicellular organisms. It is a basic component of the animal connective tissue, it is found in the synovial fluid, in the vitreous humour and in the umbilical cord; it is biocompatible, bioadsorbable, non immunogenic and it carries out an important role in several biological functions (tissue hydration, organisation of the proteoglycans in cartilage, tissue repair, embriogenesis, lubrication and cartilage protection). It is currently used in the treatment of articular diseases, in viscosurgery, as a drug carrier and in the cosmetic field.

The properties of carboxylated polysaccharides can be widely varied by introducing chemical modifications for example at the hydroxyl groups.

Because of the important biological activity of carboxylated polysaccharides, it is very interesting to obtain these polysaccharides in their derivatized forms, thereby affecting their biofunctional features.

An important modification site is the primary hydroxyl group bound to the carbon atom on position 6 of the glicopyranosidic residue.

As an example, the selective halogenation of polysaccharides such as amylose (Macromolecules, 1994, 27, 2917–2922), laminaran (Carb. Res., 1996, 292, 39–46), cyclodextrin (JP08005623), chitosan (J. Carb. Chem., 1997) is well known. Some authors report that they have obtained halogenated derivatives from aminosaccharides or disaccharides such as 2-amino-2-deoxy-glucopyranose (Tetrahedron Left., 1991, 32, 3977–3980), fructofuranose (Carb. Res., 1994, 265, 249–269), cellobiose (Austr. J. Chem., 1997, 50, 13–18).

In polysaccharides containing carboxylic groups, the high reactivity of the carboxylic group, the presence of hydrogen bonds with the solvation water which can lead to the formation of secondary structures, and the high polarity of the group renders difficult to obtain selectively modified derivatives possible. Differently from the neutral polysaccharides.

The Applicant has set up a process for the preparation of carboxylated polysaccharides halogenated on the carbon atom on position 6. The process herein described allows the obtainment of selectively modified derivatives with a high yield and high degree of substitution.

FIELD OF THE INVENTION

The present invention concerns the field of polysaccharides containing carboxylic groups and hydroxymethylenic groups (i.e. primary hydroxyl groups). The invention relates to new polysaccharides halogenated on the carbon atom on position 6 of the glicopyranosidic residue and the process for their synthesis.

SUMMARY

A new class of polysaccharides containing carboxylic groups selectively substituted with halogens on the carbon atom on position 6 of the glicopyranosidic residue and the procedure to obtain these derivatives are therein described.

The procedure entails the halogenation of carboxylated polysaccharides with alkyl aryl sulfonyl-halides in organic solvent. The products of this invention can be used as substrates in synthesis where the reactive site is the carbon that binds the halogen. Moreover, they can be used in the medical-diagnostic field.

DETAILED DESCRIPTION OF THE INVENTION

The object of the present invention consists in a group of new derivatives of carboxylated polysaccharides that are selectively substituted with an halogen on the carbon atom on position 6 of the glycopyranosidic residue.

The invention relates to the 6-halo-6-deoxy derivatives of carboxylated polysaccharides where the substituent on position 6 is selected in the group consisting of chlorine, fluorine, bromine, iodine and where the carboxylic group is present either in a free or salified form.

For the purpose of the present invention, the term "carboxylated polysaccharide" indicates each polysaccharide containing primary hydroxyl groups on the carbon atom on position 6 of the glicopyranosidic residue and one or more carboxylic groups.

The polysaccharide can be linear or branched with a molecular weight ranging preferably from 1,000 to 2,000,000, or more preferably from 100,000 to 200,000. Hyaluronic acid, gellan, xanthan, succinoglycan, pectin, chondroitine sulphate, heparan sulphate, dermatan are typical examples of these carboxylated polysaccharides. Hyaluronic acid is the preferred one.

The carboxylated polysaccharide is present either as a free acid or in salified form. The salts are selected in the group consisting of alkaline metals, alkaline earth metals and ammonium salts.

The degree of halogen substitution of these products can range from >0 to 1, preferably from 0.5 to 1, even more preferably from 0.7 to 0.9.

The term "degree of substitution" indicates the number of moles of halogen per moles of monosaccharide unit containing an hydroxymethylenic group on position 5 (primary hydroxyl group on position 6). The degree of substitution 1 corresponds to the product having all the hydroxyls on position 6 substituted with the halogen. Examples of products according to the present invention are the 6-deoxy-6 halo derivatives of hyaluronic acid, i.e. the 6-fluoro, 6-chloro, 6-bromo, 6-iododerivatives.

Thanks to the fact that the halogen group can easily be substituted with different groups (a property that is due to the remarkable ability of the halogen group to behave as a leaving group), the halogenated polysaccharides that are the object of the present invention can be used as substrates in the synthesis of 6-substituted carboxylated polysaccharides, where the halogen is substituted by a group suitably selected according to the polarity and hydro/lypophilic properties of the desired final product.

Modifications carried out in this way lead to polysaccharides with physico-chemical features that are modified with respect to the starting product, specifically in as much as biodegradability, bioavailability, ionic strength, thickening/gelling properties are concerned. The 6-chloro, and 6-bromo derivatives are particularly preferred.

Moreover, the products described according to the present invention can be used in the medical-diagnostic field as a contrast medium (nuclear magnetic resonance, tomography, scintigraphy). 6-fluoro and 6-iodio derivatives of hyaluronic acid are preferred.

A further object of the present invention is the process to obtain the carboxylated 6-halo-6-deoxypolysaccharides described above.

The procedure is characterised by the following steps:
a) solvation of the carboxylated polysaccharide, used in free or salified form;
b) halogenation of the solvated polysaccharide with an alkyl or aryl halide in the presence of an organic solvent;
c) possible alkalinization of the system obtained in step b) up to a pH ranging from 9 to 11;
d) neutralization of the system obtained in step b) or c), and recovery of the 6-halo-6-deoxy derivative of the starting carboxylated polysaccharide.

The starting polysaccharide has the features indicated above with reference to the "carboxylated polysaccharide".

Specifically, it is possible to use, as starting products, polysaccharides in the form of salts with nitrogen-containing heterocycles selected in the group consisting of pyridine, pyrazine, pyrimidine, pyrrole, pyrazole, imidazole, 1,2,3-triazole, 1,2,4-triazole, 1,2,3,4-tetrazole, 1,2,4,5-tetrazole, 1,2,3,5-tetrazole and their products of partial or total hydrogenation, possibly substituted with one or more alkyl groups containing from 1 to 6 carbon atoms. A specific example of these heterocycles is sym-collidine (2,4,6-trimethylpyridine).

According to the present invention, it is fundamental that the starting polysaccharide undergoes solvation by an organic solvent. By this process, it is possible to obtain the necessary reactivity of the polysaccharide by improving specifically its ability to interact with the halogenating reagent.

Solvation is carried out by means of a prolonged mixing of the polysaccharide with the solvent. The solvent can be selected in the group consisting of dimethylformamide, formamide, dimethylacetamide, preferably dimethylformamide.

In a preferred form, the polysaccharide can be mixed with the organic solvent under stirring for 10 hours. The solvent is further removed by evaporation under reduced pressure.

The solvation can be carried out in a cyclic way; in this case, at the end of the first cycle some fresh solvent is added, mixed again and the solvent is then removed. The procedure can be repeated one or more times. An organic solvent, preferably dimethylformamide, is added to the polysaccharide prepared in this way up to complete dissolution.

An excess of solvent is used for poorly soluble products. The halogenation reaction is carried out by adding an alkyl or aryl sulphonyl halide to the solution. The preferred halides are methanesulphonyl chloride (mesyl chloride), p-toluensulphonyl chloride, methanesulphonyl bromide (mesyl bromide), p-toluensulphonyl bromide.

If non-salified polysaccharides are used as a starting product, the halide is dissolved in a solvent, preferably dimethylformamide and then added to the polysaccharidic solution.

In a preferred embodiment, the halide is added at a temperature ranging from −60° C. and −20° C., under stirring and under nitrogen flux for not less than one hour. Ten moles of halide per mole of monosaccharide to be halogenated are preferably used.

After addition of the halide, the system is kept under these conditions for a time ranging from 30' and 2 h; later on, at room temperature for a time ranging from 30' and 6 hours and finally at 80–100° C. for a time ranging from 3 to 72 hours.

If the starting polysaccharide is used in a free form or salified with alkaline or earth alkaline metals, the pH of the mixture obtained after b) is adjusted to a value ranging from 9 to 11; the mixture is then kept for a time ranging preferably from 5 to 20 minutes at room temperature. This step is commonly performed by adding NaOH.

If the starting polysaccharide is used in the form of salt of a nitrogen-containing heterocycle, the solution after halogenation can be directly treated according to step d., i.e. without performing the alkalinization according to step c). The system obtained from b) or c) is then neutralized; the halogenated polysaccharide is recovered from the solution by means of known techniques such as precipitation, drying or freeze drying.

The reaction described herein allows the obtainment of carboxylated polysaccharides whose primary hydroxyl groups on position 6 are substituted with halogen atoms, in a high yield (higher than 80%) and with a high degree of substitution.

The invention is now described in a non limitative way by the following experimental examples.

EXPERIMENTAL PART

Example 1

Sodium Salt of 6-chloro-6-deoxyhyaluronic Acid (Starting from Sodium Salt of Hyaluronic Acid)

4 g. of sodium salt of hyaluronic acid (MW 160,000) are suspended in 100 ml. of dimethylformamide (DMF) under stirring; the solvent is removed at reduced pressure. The treatment is repeated twice. The polysaccharide is then poured in a three-neck round bottom flask supplied with a stirring system and connected to a nitrogen flow. The whole procedure is carried out under mechanical stirring and under nitrogen atmosphere. 600 ml of DMF are added. Then, the methanesulphonyl chloride (5.4 ml) is added dropwise in a time not shorter than 1 hour at the temperature of −40° C. This temperature is maintained for 1 hour, and the mixture is then left cooling. Three hours after reaching room temperature, the mixture is brought to the temperature of 80° C., and reaction is left reacting for 24 h. The reaction mixture is then brought to pH 10 with NaOH. It is neutralized and dialysed against distilled water (6 times, 2 liters) for 48 hours. The solution is then freeze-dried.

The 13C-NMR spectrum of the product obtained is shown in Table 1.

Example 2

Sodium Salt of 6-chloro-6-deoxyhyaluronic Acid (Starting from Sym-collidinium Salt of Hyaluronic Acid)

The sym-collidinium salt is prepared as follows:

A solution of 5 g of sodium salt of hyaluronic acid (MW 160,000) in distilled water is brought to pH=2 with HCl 4N and neutralized with sym-collidine at room temperature. The compound (5.2 g) is then recovered by liophylization.

5 g of sym-collidinium salt of hyaluronic acid obtained in this way are suspended in 100 ml of dimethylformamide (DMF) under stirring and the solvent is then removed by evaporation at reduced pressure. The treatment is repeated twice.

The polysaccharide is then poured in a three-neck round bottom flask supplied with a stirring system and connected to a nitrogen flow. The procedure is carried out under mechanical stirring and in nitrogen atmosphere. After addition of 600 ml of DMF, methanesulphonyl chloride (7.75 ml) is added dropwise in a time not shorter than one hour at the temperature of −40° C. This temperature is kept for 1 h. Three hours after reaching room temperature, the mixture is brought to the temperature of 80° C and is left reacting for 16 h, and then at 100° C. for 6 hours. The reaction mixture is the neutralized with NaHCO3. Dialysis against distilled water is then carried out (6 times, 2 liters) for 48 hours. From the freeze-dried solution, 4.6 g of final product are recovered.

The 13 C-NMR spectrum gives results that are similar to those of the compound prepared in Example 1.

Example 3

Sodium Salt of 6-bromo-6-deoxyhyaluronic Acid (Starting from Sym-collidinium Salt of Hyaluronic Acid)

5 g. of sym-collidinium salt of hyaluronic acid obtained as described in Example 2 are suspended in 100 ml of dimethylformamide (DMF) under stirring and the solvent is then removed by evaporation at reduced pressure. The treatment is then repeated twice. The polysaccharide is poured in a three-neck round bottom flask supplied with a stirring system and connected to a nitrogen flow. The procedure is carried out under mechanical stirring and in nitrogen atmosphere. After addition of 600 ml of DMF, the dripping of methanesulphonyl chloride (7 ml) takes place in a time not shorter than one hour at the temperature of −40° C. The mixture is kept at this temperature for 1 h. Three hours after it has reached room temperature, the mixture is brought to the temperature of 80° C. and the reaction is carried out for two hours and then at 100° C. for further two hours. The reaction mixture is then neutralized with NaHCO3. The dialysis against distilled water is then carried out (6 times, 2 liters) for 48 hours. From the freeze-dried solution, 4.3 g of final product are recovered.

TABLE 1

|  | G1 | G2 | G3 | G4 | G5 |  |
| --- | --- | --- | --- | --- | --- | --- |
| HA | 103.694 | 73.084 | 74.199 | 80.554 | 76.918 |  |
| es. 1 | 103.478 | 73.001 | 74.233 | 81.131 | 76.808 |  |

|  | N1 | N2 | N3 | N4 | N5 | N6 | N6-Cl |
| --- | --- | --- | --- | --- | --- | --- | --- |
| HA | 101.046 | 54.838 | 83.302 | 69.094 | 75.970 | 61.182 |  |
| es. 1 | 101.086 | 54.769 | 82.573 | 69.836 | 74.674 | * | 44.554 |

HA = hyaluronic acid
G = glucuronic acid
N = N-acetylglucosamine
* Signal (16%) indicating the presence of the N6-OH group; degree of substitution of the compound in example 1:84%.

What is claimed is:

1. 6-substituted-6-deoxy-carboxylated polysaccharides, wherein the substituent on the carbon atom on position 6 of the glycosidic residue is selected from the group consisting of chlorine, bromine, fluorine, iodine and wherein the carboxylic group is in the free or in the salified form.

2. Polysaccharides according to claim 1 having a molecular weight of 1000 to 2,000,000.

3. Polysaccharides according to claim 2 having a molecular weight of 100,000 to 200,000.

4. Polysaccharides according to claim 1 having a substitution degree of 0.5 to 1.

5. Polysaccharides according to claim 1, wherein the carboxylated polysaccharide is hyaluronic acid.

6. Polysaccharides according to claim 5, selected from the group consisting of 6-chloro-6-deoxyhyaluronic acid, 6-fluoro-6-deoxyhyaluronic acid, 6-bromo-6-deoxyhyaluronic acid and 6-iodo-6-deoxyhyaluronic acid.

7. A process for the preparation of 6-substituted-6-deoxy carboxylated polysaccharides according to claim 1, comprising the following steps:

a) salvation of a carboxylated polysaccharide, either in the free or the salified form;

b) halogenation of the solvated carboxylated polysaccharide with alkyl or aryl sulphonyl halide in the presence of an organic solvent;

c) alkalinization of the mixture obtained in step b) at a pH ranging from 9 to 11, said step c) being optional if the polysaccharide of step a) is used in the form of a salt of a nitrogen containing heterocycle;

d) neutralization of the mixture obtained in steps b) or c) and recovery of the 6-deoxy-6-halogen derivative of the carboxylated polysaccharide.

8. A process according to claim 7, wherein the polysaccharide used in step a), has a molecular weight between 1000 and 2,000,000.

9. A process according to claim 7, wherein the 6-halogen derivatives of polysaccharide obtained in step d) has a substitution degree of 0.5 to 1.

10. A process according to claim 7, wherein the carboxylated polysaccharide used in step a) is hyaluronic acid either in the free or in the salified form.

11. A process according to claim 10, wherein the carboxylated polysaccharide is salified with a nitrogen containing heterocycle.

12. A process according to claim 11, wherein the nitrogen containing heterocycle is sym-collidine (2,4,6-trimethylpyridine).

13. A process according to claim 7, wherein the salvation is carried out in one or more cycles consisting of the mixing of the carboxylated polysaccharide with dimethylformamide and in the subsequent removal of the solvent by evaporation.

14. A process according to claim 7, wherein the halide used in step b), is selected from the group consisting of methanesulfonyl chloride and methanesulfonyl bromide.

15. A process according to claim 11, wherein the solution derived from step b) is directly treated according to the procedure described in step d.

16. A process according to claim 7, wherein the recovery of the halogenated polysaccharide in step d) is carried out by freeze-drying the solution obtained in step c).

* * * * *